United States Patent
Townsend

[19]

[11] Patent Number: 5,921,611
[45] Date of Patent: Jul. 13, 1999

[54] UPWARDLY RETRACTING VEHICLE DOOR

[75] Inventor: John A. Townsend, Bloomfield Hills, Mich.

[73] Assignee: Joalto Design Inc., Southfield, Mich.

[21] Appl. No.: 08/769,895

[22] Filed: Dec. 9, 1996

Related U.S. Application Data

[60] Continuation-in-part of application No. 08/439,605, May 12, 1995, abandoned, which is a division of application No. 08/401,206, Mar. 9, 1995, abandoned, which is a division of application No. 08/257,080, Jun. 9, 1994, which is a division of application No. 07/912,790, Jul. 13, 1992, Pat. No. 5,378,036.

[51] Int. Cl.⁶ .................................................. B60J 5/10
[52] U.S. Cl. ................ 296/155; 296/106; 296/146.8; 296/146.2; 49/198; 49/199
[58] Field of Search ................ 296/106, 146–8, 296/155, 146.2; 49/40, 41, 198, 199

[56] References Cited

U.S. PATENT DOCUMENTS

| | | | |
|---|---|---|---|
| 1,940,444 | 12/1933 | Burgman | 296/107 |
| 2,622,919 | 12/1952 | Scott | 296/44 |
| 2,651,541 | 9/1953 | Surles | 296/44 |
| 2,819,114 | 1/1958 | Lake | 296/155 |
| 2,893,727 | 7/1959 | Barnard | 268/74 |
| 3,158,397 | 11/1964 | Peras | 296/106 |
| 3,397,487 | 8/1968 | Hunt et al. | 49/420 |
| 3,567,209 | 3/1971 | Lathers | 269/50 |
| 3,645,043 | 2/1972 | Velavicius et al. | 49/370 |
| 3,699,716 | 10/1972 | Wanless | 49/40 |
| 3,827,182 | 8/1974 | Van Hellgputte | 49/41 X |
| 3,887,227 | 6/1975 | Deckert | 296/188 |
| 4,039,222 | 8/1977 | Wolf et al. | 296/137 E |
| 4,331,359 | 5/1982 | Sheldon | 296/146 |
| 4,415,195 | 11/1983 | Furukawa et al. | 296/146 |
| 4,471,251 | 9/1984 | Yamashita | 296/146.2 X |
| 4,620,743 | 11/1986 | Eke | 296/146.8 |
| 4,642,941 | 2/1987 | Staran | 49/352 |
| 4,793,099 | 12/1988 | Friese et al. | 49/380 |
| 4,801,172 | 1/1989 | Townsend | 296/155 |
| 4,940,282 | 7/1990 | Townsend | 296/155 X |

FOREIGN PATENT DOCUMENTS

| | | | |
|---|---|---|---|
| 961 405 | 5/1950 | France | 10/1 |
| 1 013 189 | 7/1952 | France | 296/155 |
| 1 026 247 | 4/1953 | France . | |
| 73.938 | 10/1960 | France | 296/216 |
| 895 409 | 11/1953 | Germany | 63/44 |
| 3 335 699 | 4/1985 | Germany | 296/106 |
| 3 725 517 | 10/1988 | Germany | 296/155 |
| 480023 | 4/1953 | Italy . | |
| 613307 | 12/1960 | Italy | 296/155 |
| 202932 | 11/1984 | Japan | 296/155 |
| 3-118283 | 5/1991 | Japan | 296/155 |
| 405085176 | 4/1993 | Japan | 296/155 |
| 406144013 | 5/1994 | Japan | 276/146.8 |
| 2 25087 | 4/1943 | Switzerland | 296/155 |
| 1 085 891 | 10/1967 | United Kingdom | 296/155 |
| 1 592 155 | 1/1978 | United Kingdom | B60J 5/08 |

*Primary Examiner*—Dennis H. Pedder
*Attorney, Agent, or Firm*—Radner, Fishman & Grauer PLLC

[57] ABSTRACT

An upwardly retracting vehicle door is disclosed, such as for use on the rear of a mini-van. The door includes a lower primary door panel and an upper secondary door panel, such as a glass window, that is retractable into the primary door panel. The primary door panel includes rollers on both side edges for slidably mounting the primary door panel on channels located on the vehicle body. When the primary door panel is opened, the window retracts into the primary door panel while the primary door panel travels upward toward the window and along an arcuate path preferably into a pocket within the vehicle roof. In a first embodiment of the invention, a single weather seal is used for both the primary door panel and window on each side with the primary door panel sliding over the seal when opening and closing. In a second embodiment, separate seals for the primary door panel and window are used on each side. Angled portions formed at the bottom of the channels allow the primary door panel to travel outward when first opening so that the primary door panel and window clear the primary door panel and window seals and travel over them without contact.

24 Claims, 15 Drawing Sheets

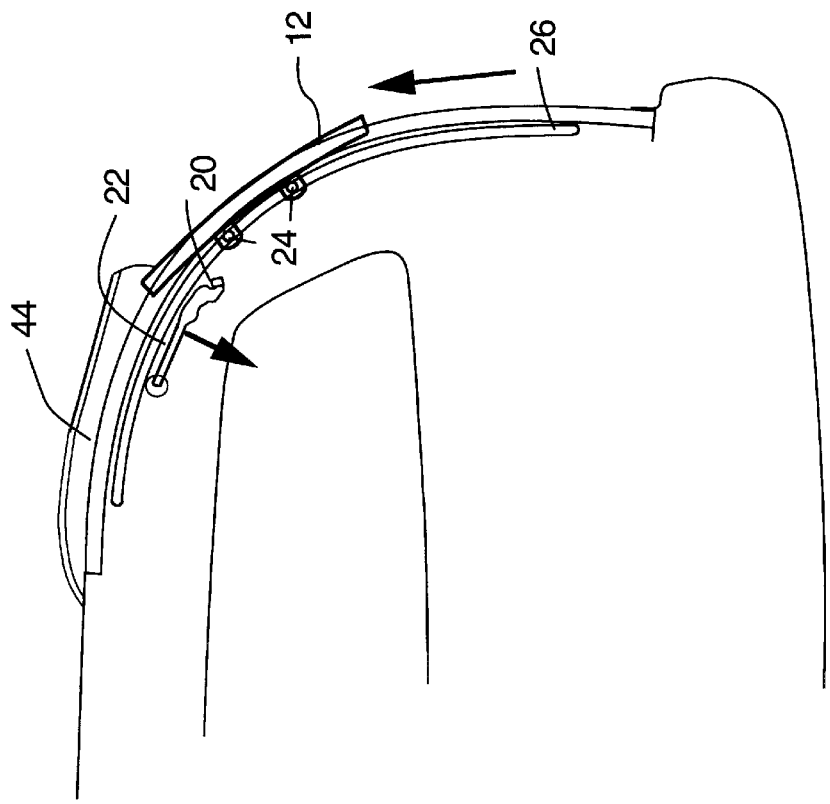
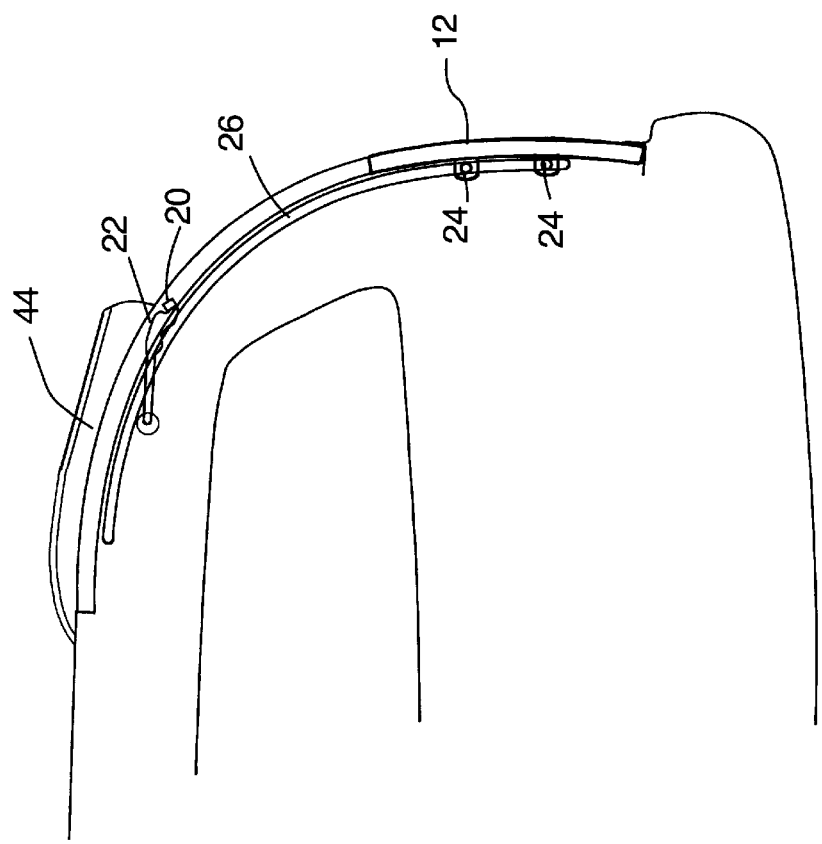
FIG. 7A
FIG. 7B

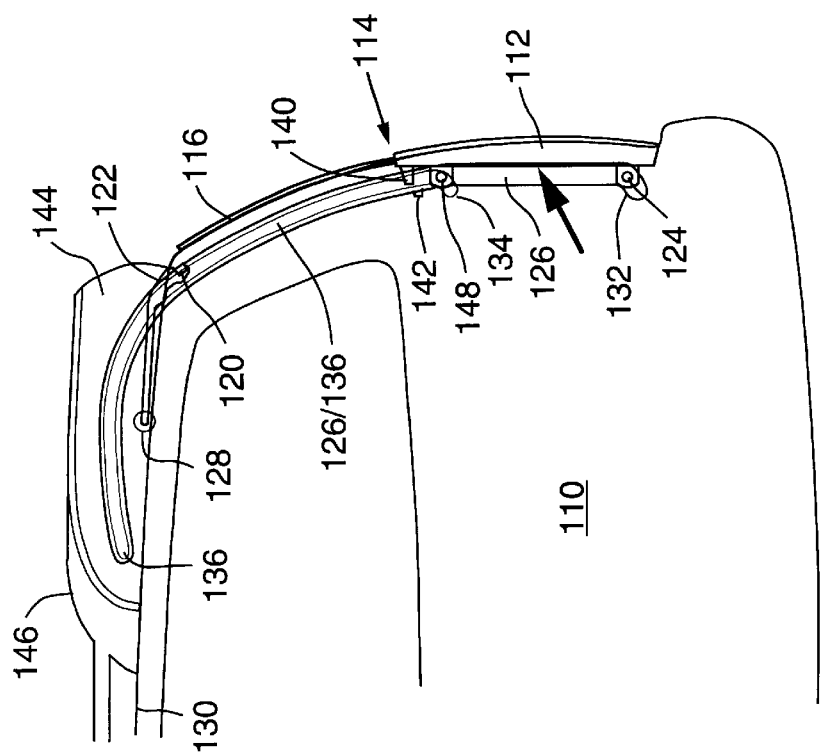
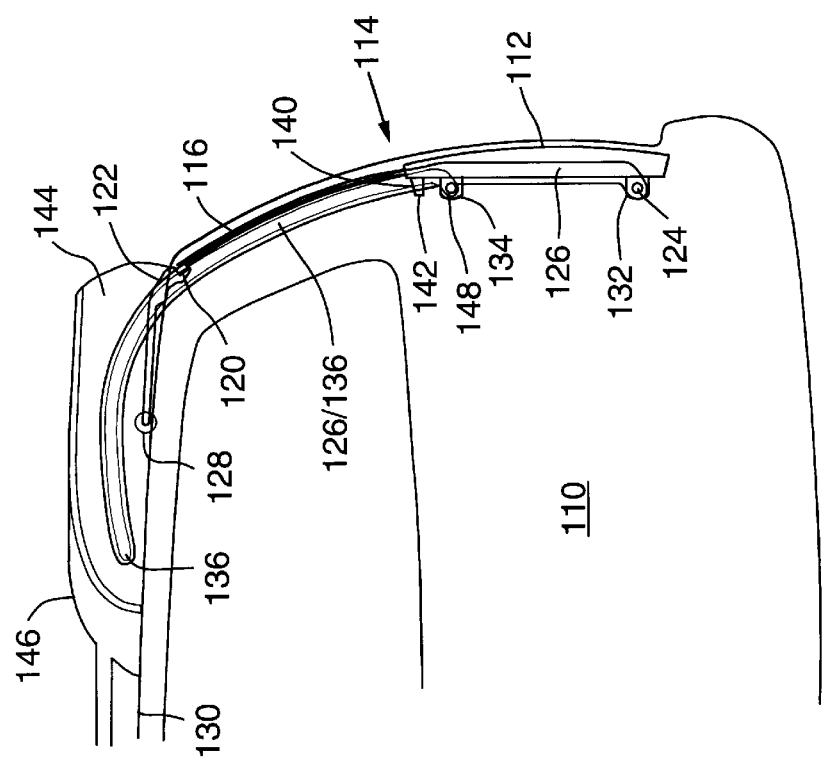

UPWARDLY RETRACTING VEHICLE DOOR

This is a continuation-in-part of application Ser. No. 08/439,605, filed May 12, 1995, now abandoned which is a divisional of application Ser. No. 08/401,206, filed Mar. 9, 1995, now abandoned which is a divisional of Ser. No. 08/257,080, filed Jun. 9, 1994, which is a divisional of Ser. No. 07/912,790, filed Jul. 13, 1992, issued as U.S. Pat. No. 5,378,036 on Jan. 3, 1995.

BACKGROUND OF THE INVENTION

1. Field of the Invention

The present invention relates to doors for wheeled vehicles, such as for sedans, vans, trucks, and other automobiles, and in particular to vertically sliding doors retractable in the automobile roof.

2. Discussion of the Prior Art

Many rear door configurations currently exist for providing access to the rear of a vehicle. These include tail gates that pivot downwardly into a horizontal orientation when open, double conventional doors that pivot outwardly to the side of the vehicle, hatch doors that pivot upwardly above the rear opening, and combinations of the above. Almost all configurations provide a solid closure over the lower portion of the rear opening, and either a fixed or separately openable glass closure over the upper portion of the opening.

Vertically sliding vehicle doors have been described in prior art patents to John A. Townsend, inventor of the present invention. These include U.S. Pat. Nos. 4,801,172, 4,940,282, and 5,378,036, incorporated herein by reference. The former two patents explain the basic construction, features, and operation of a vertically sliding automobile door that retracts beneath the vehicle's floor, while the latter patent describes variations and improvements thereto, including an overhead rear door which retracts above the vehicle roof.

SUMMARY OF THE INVENTION

The present invention is directed to improvements in an overhead vehicle door, such as on the rear of a mini-van, which retracts above the vehicle roof.

The inventive door is configured much like a conventional rear door with a generally upright, rectangularly shaped primary door panel covering the lower portion of a rear cargo opening, and a secondary door panel, such as of glass, retractable into the primary door panel, covering the upper portion of the opening when extended above the primary door panel.

Both side edges of the inventive door carry rollers for mounting the primary door panel on generally vertical tracks located on opposite sides of the door opening. To open the door, the secondary door panel is lowered into the primary door panel while the primary door panel is simultaneously raised along the tracks, preferably by an electric motor located within the primary door panel. Near the top of the door opening, the roller tracks turn from a generally vertical orientation to a generally horizontal orientation aligned with the vehicle roof, such that the primary door panel is stowed above, within, or just below the vehicle roof when fully open. To allow the primary door panel to clear the rear edge of the roof when opening or closing, a rearward portion of the roof is pivotably mounted along its leading edge such the trailing edge can be lowered to allow the primary door panel to pass over it.

The inventive door arrangement allows fully automatic operation of the door, controlled by electric switch, key lock, or remote control. Other advantages include the movement of the door to a location that leaves the door opening completely unobstructed. Unlike other types of rear doors, the inventive door does not obstruct overhead clearance behind the vehicle, block side access to the cargo opening, or require cargo to be lifted over an open tail gate. Unlike a rear door which retracts underneath the vehicle, there are no constraints placed on the location of the drive train components, gasoline tank, spare tire, passenger seating, ground clearance and the like.

Applications for the inventive door arrangement include, but are not limited to, passenger vehicles, personal utility vehicles, industrial cargo vans, and ambulances.

In accordance with a first embodiment of the invention, an expandable weather seal is provided along the edges of the door opening to seal against the edges of the primary door panel and secondary door panel when closed, yet allow the primary door panel to pass through the upper region of the door opening when moving to or from the overhead stowed position. In this embodiment, the seals are located inboard of the rollers and the lateral edges of the primary door panel and they contact the primary door panel in a narrowed region adjacent to the secondary door panel edges.

In accordance with a second embodiment, the lower ends of the roller tracks are angled inward, causing the primary door panel to move toward the front of the vehicle as it reaches the fully closed position. This permits non-vertical, structural keys on the primary door panel to engage mating receptacles adjacent to the door opening when the primary door panel closes to allow the primary door panel to become a structural member of the vehicle chassis. This configuration also allows the primary door panel to contact weather seals when closed. When the primary door panel is opened, it moves outward away from the weather seals and mating receptacles so that the upward movement of the primary door panel is unobstructed.

BRIEF DESCRIPTION OF THE DRAWINGS

FIGS. 7A–7C are a sequence of side elevational views schematically showing the door of the first embodiment moving from a fully closed position in FIG. 7A to a fully open position in FIG. 7C.

FIGS. 9A–9F are a sequence of side elevational views schematically showing the door of the second embodiment moving from a fully closed position in FIG. 9A to a fully open position in FIG. 9F.

DETAILED DESCRIPTION OF THE PREFERRED EMBODIMENTS

Figure 1:
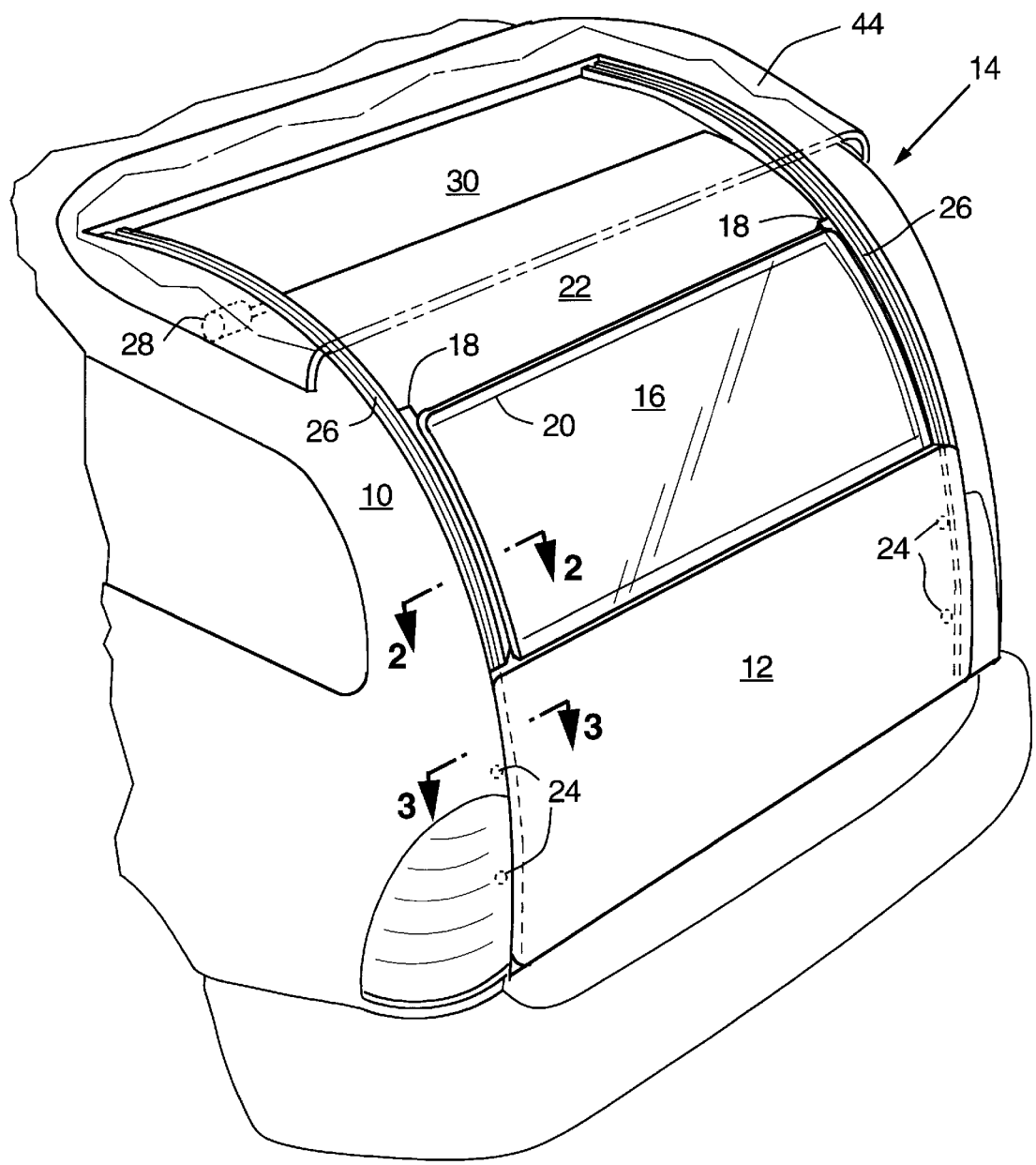
FIG. 1 is a perspective view of the rear of a vehicle constructed according to a first embodiment of the present invention.
Figure 6:
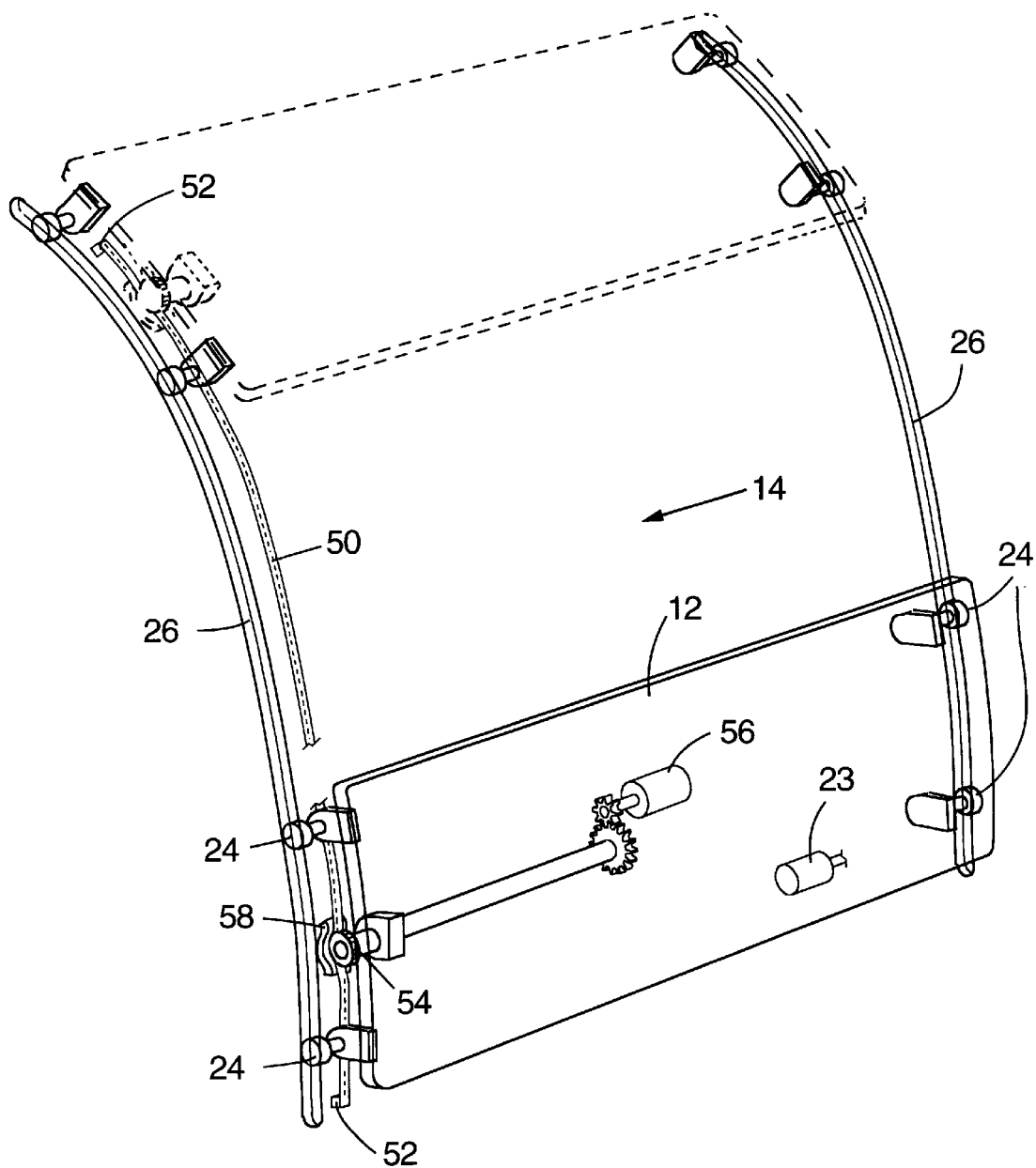
FIG. 6 is a perspective view of the first embodiment schematically showing roller guide and drive components and the path followed by the door when moving from the closed position to the open position.

Referring to FIGS. 1 and 7A, the rear portion of a vehicle body 10 is shown configured with a first embodiment of the inventive door apparatus. When closed as shown, primary door panel 12 covers the lower portion of door opening 14, while secondary door panel 16, such as of glass, covers the upper portion of opening 14, much like a conventional door and window arrangement. The lateral edges of secondary door panel 16 contact expandable side seals 18, which are mounted on body 10, to seal the vehicle interior from wind and weather. Similarly, the top edge of secondary door panel 16 seals against top seal 20, which is mounted on the trailing edge of rear roof flap 22. Secondary door panel 16 is retractable into primary door panel 12 in a conventional manner when primary door panel 12 is in a closed position, preferably by an electric motor 23 located within primary door panel 12 (as shown in FIG. 6.)

Figure 2:
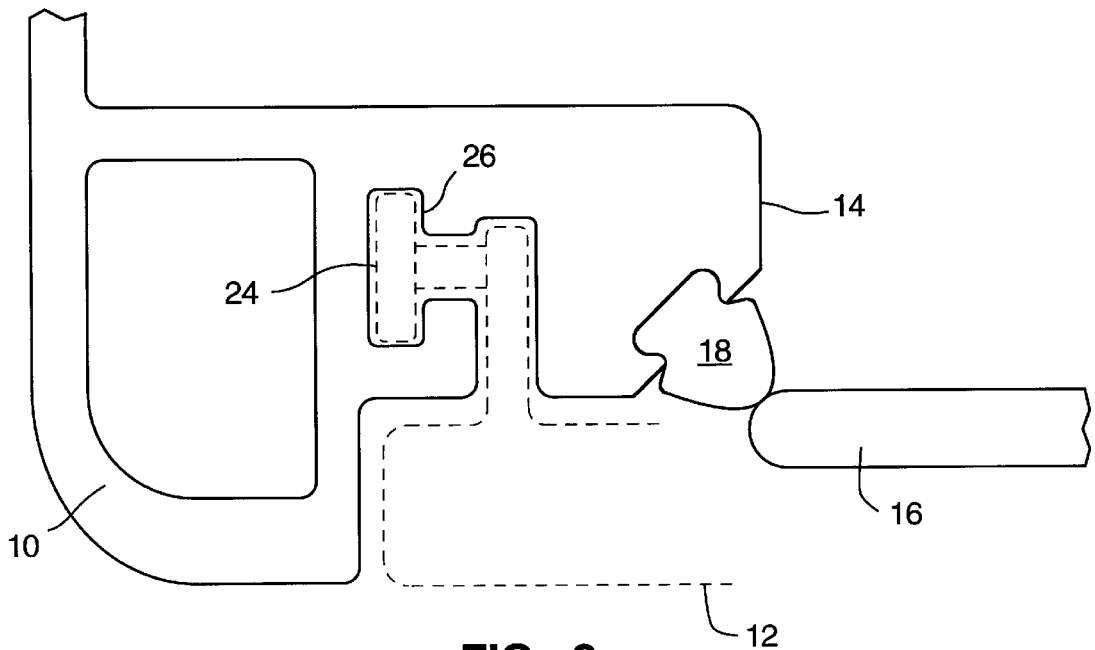
FIG. 2 is a cross-sectional plan view taken along line 2—2 in FIG. 1.
Figure 3:
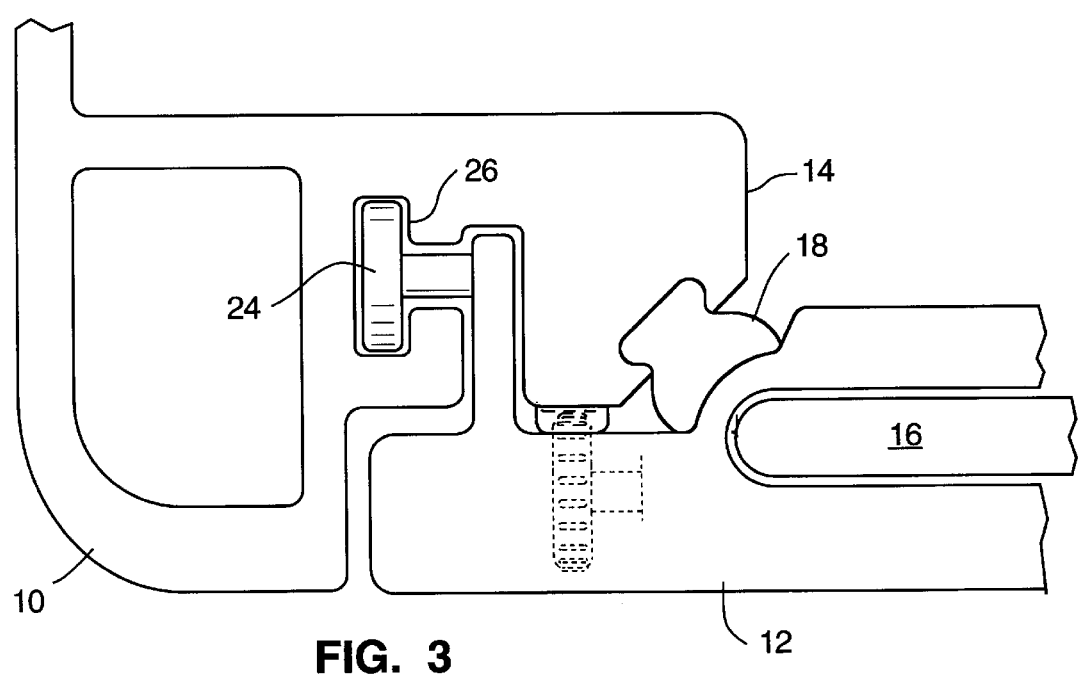
FIG. 3 is a cross-sectional plan view taken along line 3—3 in FIG. 1.

Referring to FIGS. 2 and 3, the configuration of side seals 18 is shown (the opposite side of vehicle body 10 and primary door panel 12 being a mirror image of that shown.) Side seal 18 is mounted to body 10, has a constant cross-section, and extends down the entire side of door opening 14. As shown in FIG. 2, seal 18 expands to contact secondary door panel 16. As shown in FIG. 3, seal 18 is compressed where it contacts a narrowed portion of primary door panel 12.

Rollers 24 are provided on both sides of primary door panel 12 outboard of seals 18 to slidably mount door 12 to vehicle body 10. Recessed channels 26 are provided on opposite sides of door opening 14 for receiving rollers 24 and extend over the rear portion of the vehicle roof.

Figure 4:
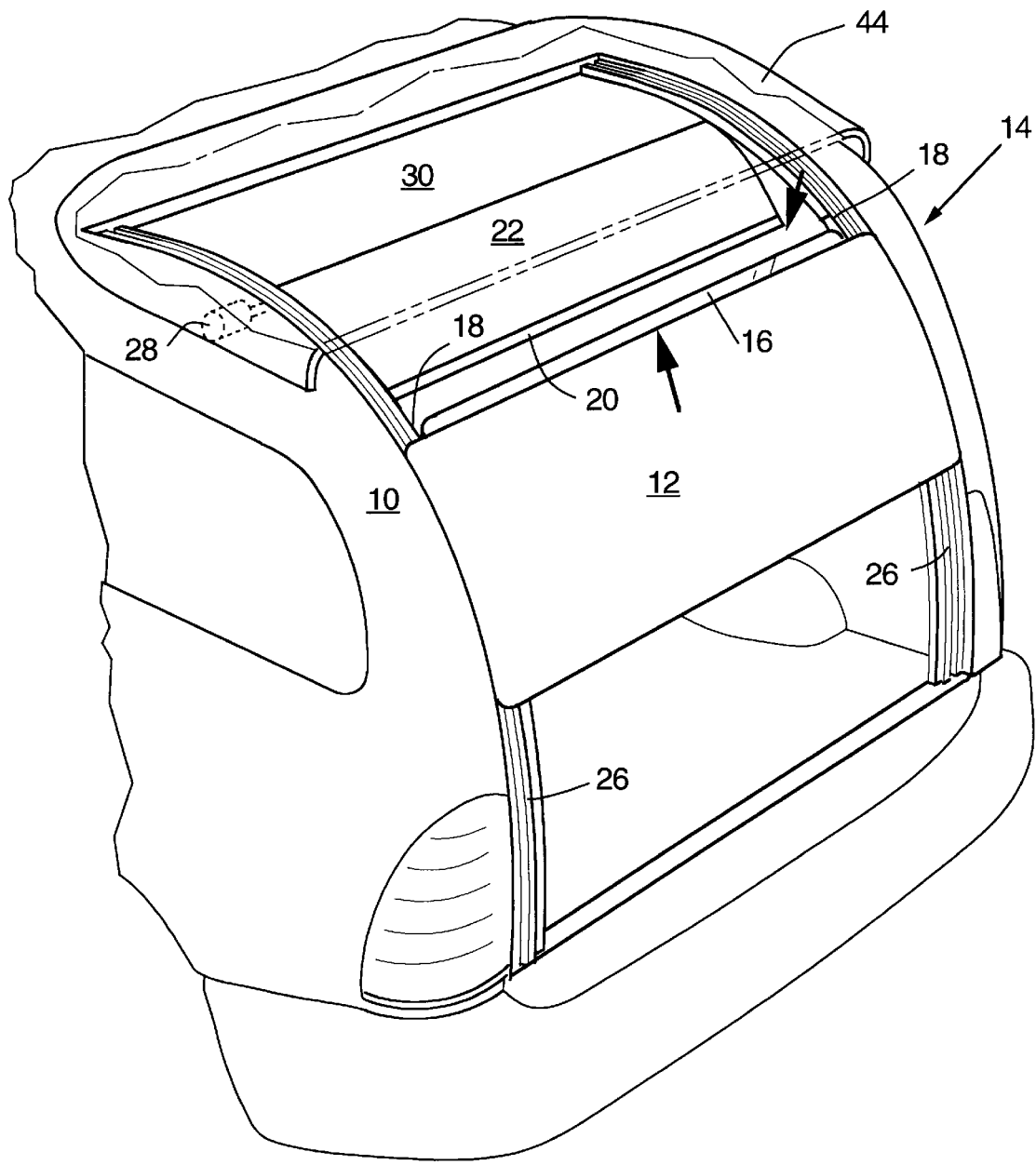
FIG. 4 is a perspective view similar to FIG. 1 with the inventive door moving toward the open position and with the window almost fully retracted therein.

Referring to FIGS. 4 and 7B, the sequence of opening door 12 will be described. Rear roof flap 22 is pivotally mounted along its leading edge to vehicle body 10. Preferably, an electric motor 28 drives flap 22 between a raised position (shown in FIGS. 1 and 7A) and a lowered position (shown in FIGS. 4 and 7B). Lowering flap 22 provides a clearer path for door 12 when it is raised above vehicle roof 30. If the rear vehicle geometry is such that there is sufficient clearance between door 12 and the rear edge of roof 30 when door 12 is moving onto roof 30, then rear roof flap 22 may be omitted.

To open door 12, secondary door panel 16 is retracted into primary door panel 12. Once the top edge of secondary door panel 16 is lowered below top seal 20, rear roof flap 22 is lowered as shown in FIGS. 4 and 7B. Primary door panel 12 is then raised, preferably at the same time that secondary door panel 16 is being lowered. Primary door 12 compresses side seals 18 as it slides over them (as shown in FIG. 3). Door 12 continues to travel upward and then forward along roller channels 26 with secondary door panel 16 retracted within.

Figure 5:
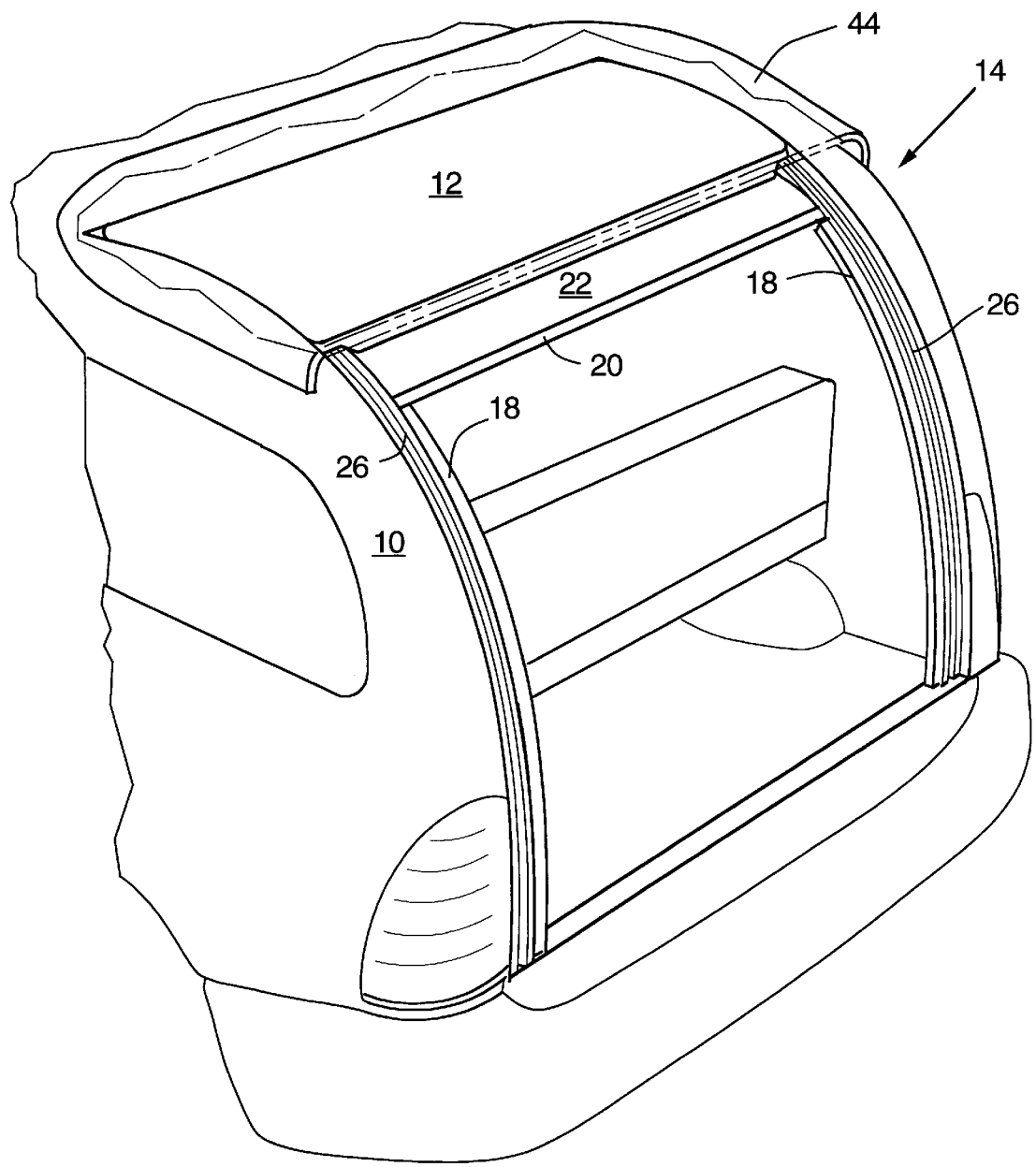
FIG. 5 is a perspective view similar to FIG. 1 with the inventive door in the fully open position.
Figure 7C:
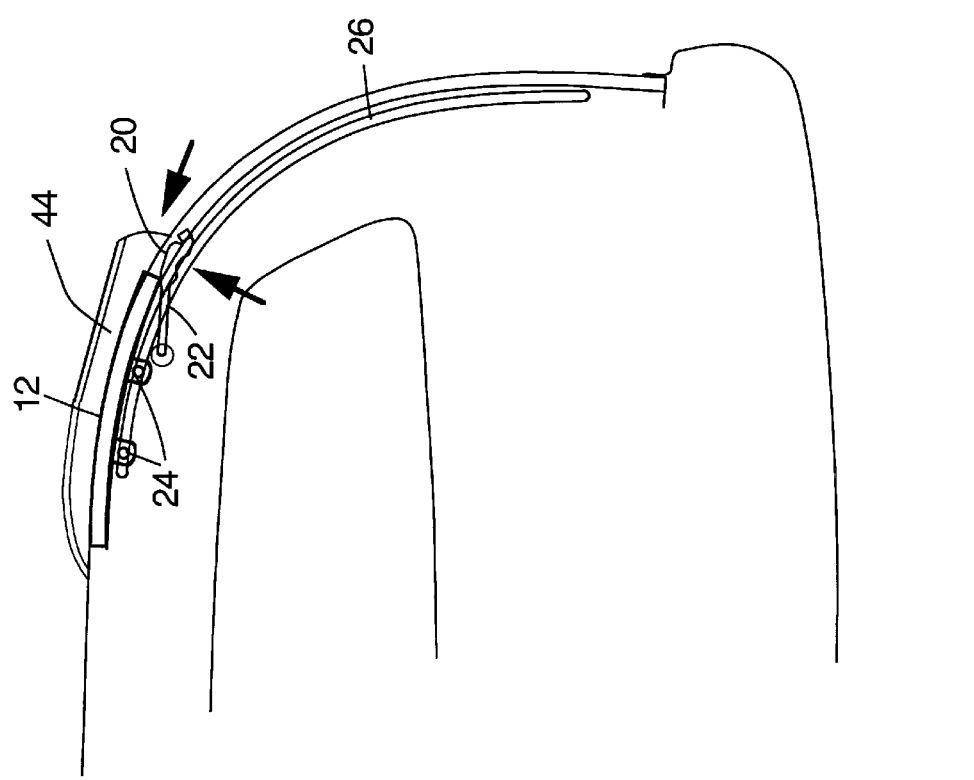

Referring to FIGS. 5 and 7C, door 12 is show as it reaches its fully open and stowed position above and parallel to the roof. Once door 12 is in the fully open position, rear roof flap 22 returns to its normal position in line with roof 30. Preferably, door 12 is covered by a protective roof pocket 44 when it is in the open position. Alternatively, door 12 could retract above or below roof 30 with roof pocket 44 omitted.

To close door 12, the above sequence is reversed. First, rear roof flap 22 is lowered. Then door 12 is driven rearward and downward. Once door 12 passes over roof flap 22 and rotates downward, roof flap 22 may be returned to its raised position and secondary door panel 16 can begin extending from within primary door panel 12. When primary door panel 12 reaches the bottom of its travel and secondary door panel 16 is fully extended, door opening 14 is fully covered. Secondary door panel 16 may be independently opened and closed when primary door panel is in the closed position.

Referring to FIG. 6, door 12 is preferably driven up and down by sprockets rotably mounted on opposite sides of door 12 which engage flexible tape segments mounted along both sides of door opening 14, as fully described below and in U.S. Pat. No. 5,378,036. FIG. 6 also shows the path followed by door 12 as rollers 24 follow channels 26 to guide door 12 from the closed position (shown by solid lines) to the open position (shown by dashed lines.)

Figure 8:
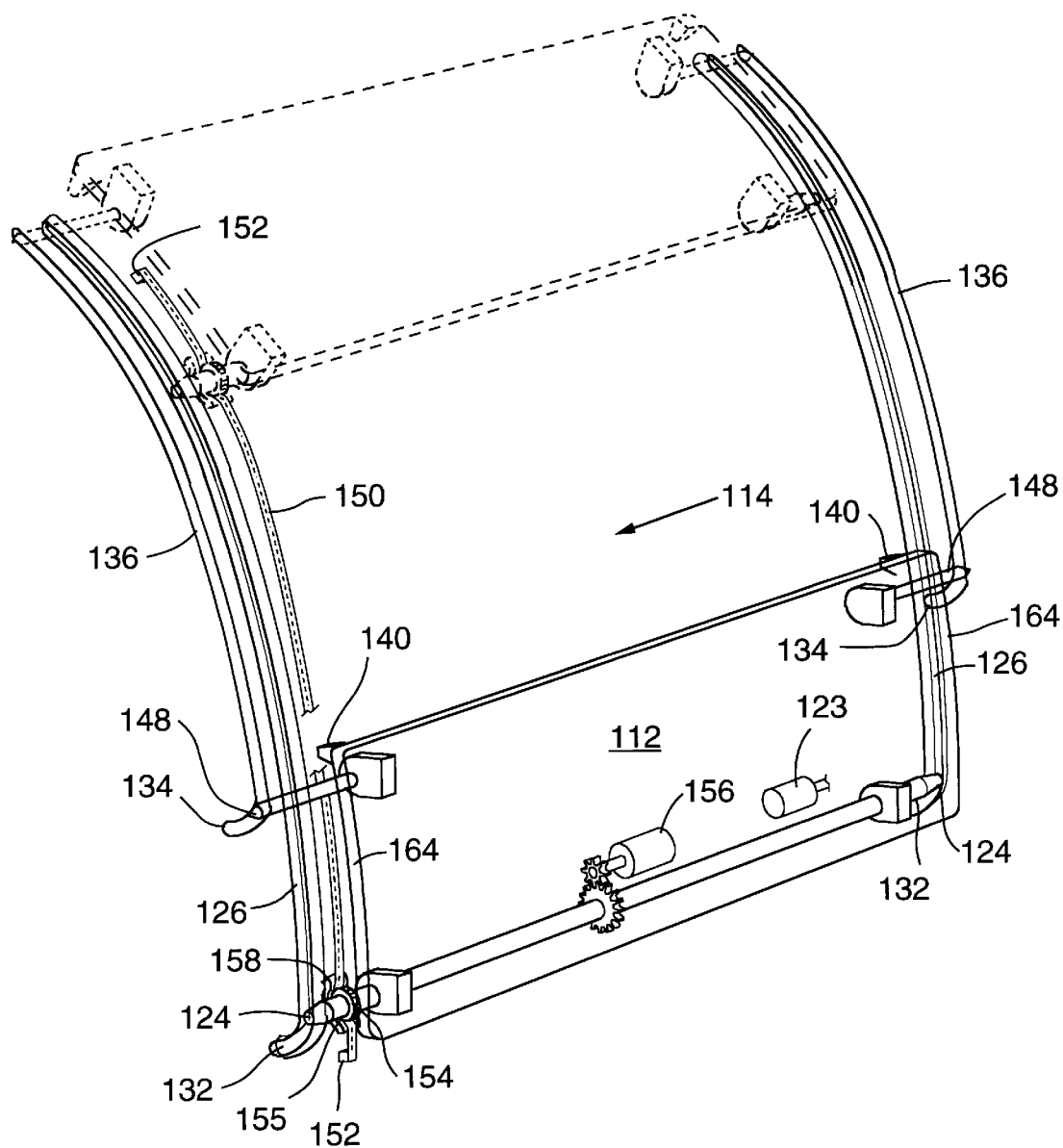
FIG. 8 is a perspective view of a second embodiment of the present invention schematically showing roller guide and drive components and the path followed by the door when moving from the closed position to the open position.

Referring to FIG. 8, a second embodiment of the inventive door is shown with like features having the same reference numerals as the first embodiment above but incremented by 100. The main difference between the second embodiment and the first is that the second embodiment incorporates inwardly angled channel sections 132 and 134 at the bottom of roller channels 126 and 136, respectively. This partially angled door path causes door 112 to move outward when opening before traveling upward so that door 112 clears window side seals 118 and door side seals 138 (shown in FIGS. 11–13) rather than sliding over them.

Another advantage to this arrangement is that inwardly angled structural keys 140 attached to door 112 and mating receptacles 142 attached to body 110 can be utilized, such as described in U.S. Pat. No. 5,378,036 and shown in FIGS. 9A–9F herein. This allows door 112 to become a structurally integral part of the vehicle chassis and body 110 when closed. Channel sections 132 and 134 are oriented at an angle that matches the inclination of keys 140 and receptacles 142 so that the two mate smoothly as door 112 approaches the fully closed position. Alternatively, structural keys 140 can be mounted on body 110, and mating receptacles mounted on door 112.

Upper rollers 148 and lower rollers 124 should each travel in their own roller channels 136 and 126, respectively. This ensures that lower rollers 124 do not get diverted into upper angled channel sections 134 as door 112 is closing, but rather they continue to travel down channel 126 until they reach lower angled channel sections 132. This also ensures that upper rollers 148 do get diverted into upper angled channel sections 134 as door 112 is closing rather than continuing to travel down channel 126. One way of providing separate channels for upper rollers 148 and lower rollers 124 is to space the two channels apart longitudinally with respect to the vehicle, one in front of the other. Alternatively, the two channels can coincide and be spaced apart laterally, with one channel being deeper than the other. This latter arrangement is preferable and is schematically shown in FIGS. 8, 9A–9F, 12 and 13.

Figure 12:
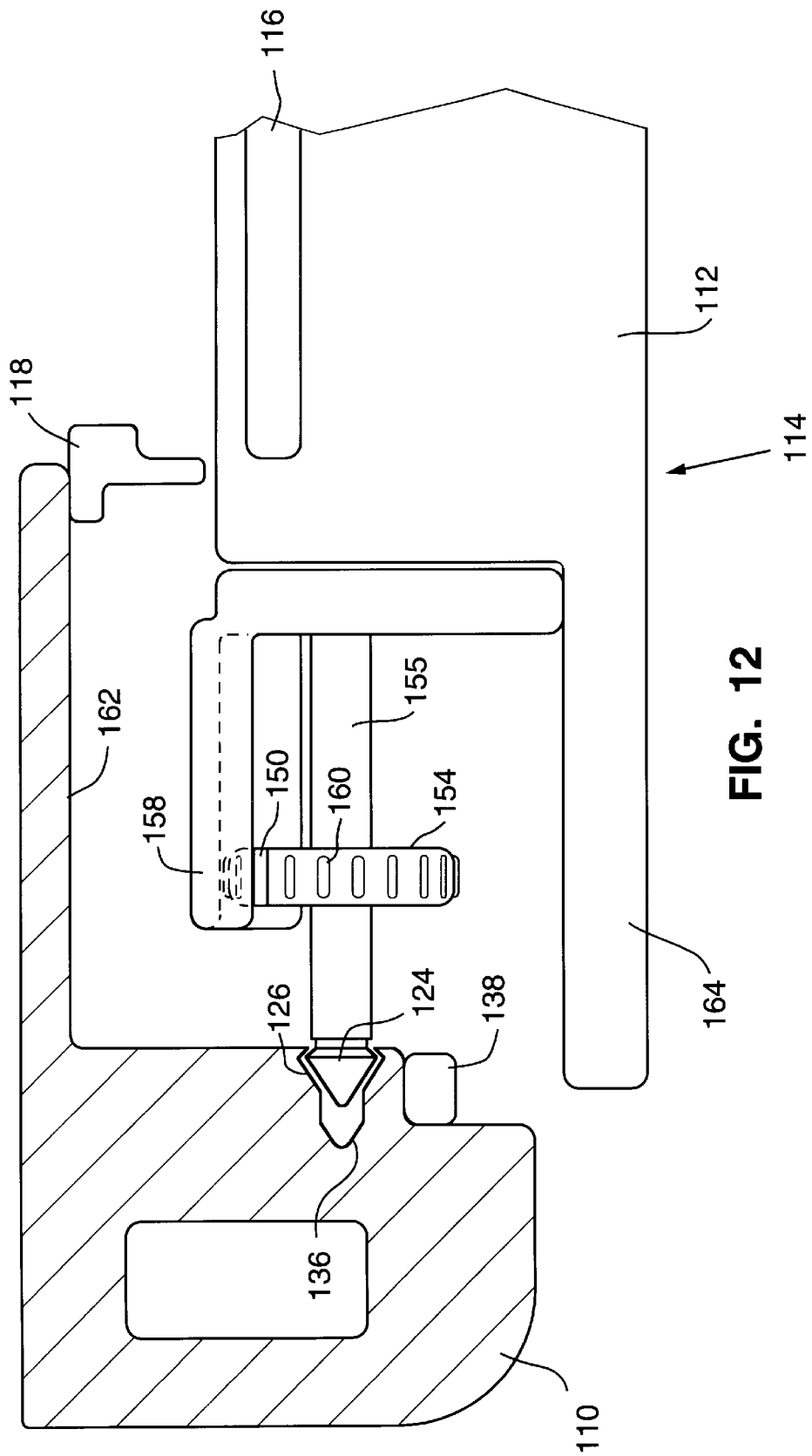
FIG. 12 is an enlarged plan view with parts shown in section showing a lower roller and a portion of the door in FIG. 8 shifted outward and moving towards the open position.

Referring to FIG. 12, the preferred arrangement of overlapping roller channels 126 and 136 is shown (it being understood that the opposite side of door 112 and body 110 which is not shown is a mirror image of FIG. 12). The cross-sectional portion of vehicle body 110 in FIG. 12 is taken along a plane above upper angled channel section 134 where channels 126 and 136 overlap. Channel 126 is wider and shallower and retains lower roller 124. Channel 136 is narrower and deeper and retains upper roller 148 (shown in FIG. 8). Because of the different diameters and spindle lengths of upper and lower rollers 148 and 124, respectively, each remains in its own channel. Both channels 126 and 136 have V-shaped bottom surfaces for contacting the cone shaped rollers 124 and 148, respectively.

Referring again to FIG. 8, wider channel 126 connects with lower angled channel section 132, which is also wider and shallower. Narrower channel 136 connects with upper angled channel section 134, which is also narrower and deeper. With this arrangement, upper and lower rollers 148 and 124 share overlapping paths until door 112 approaches a fully closed position. At this point, upper and lower rollers 148 and 124 move inward along different paths that are parallel but located at different elevations.

Figure 9D:
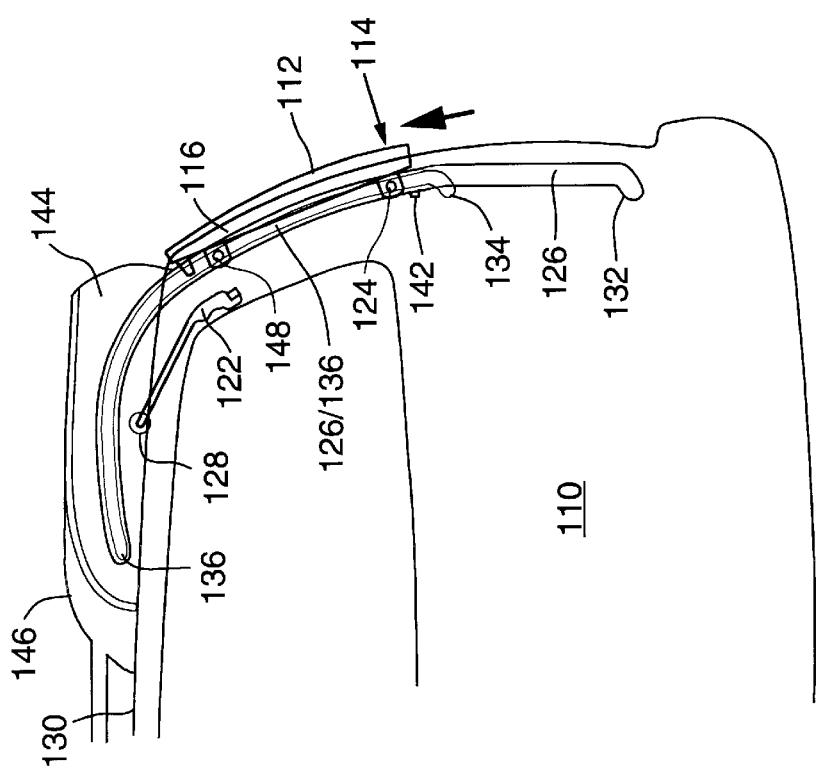
Figure 9C:
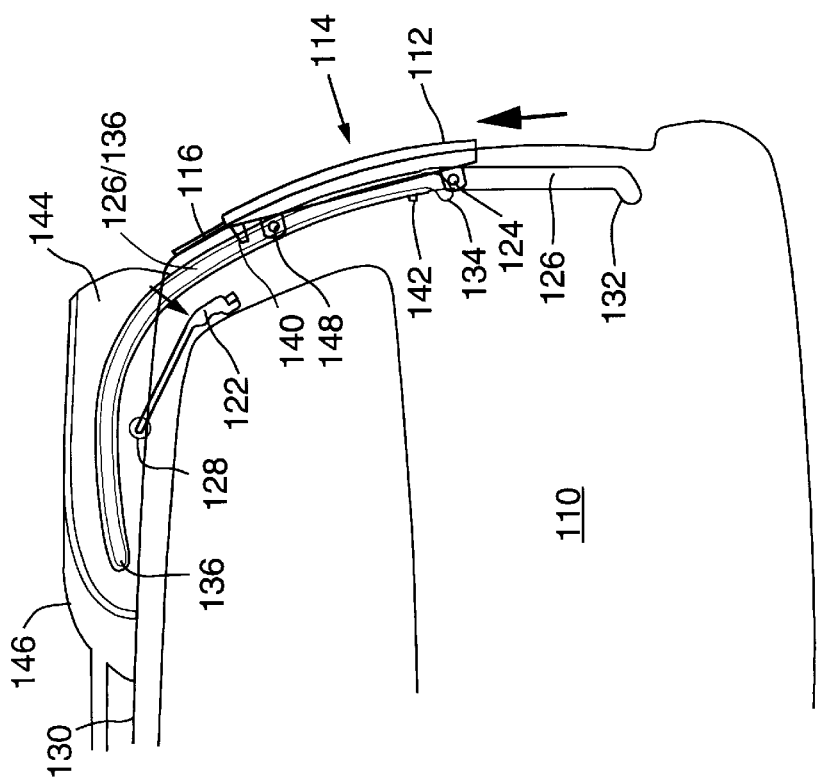
Figures 9E, 9F:
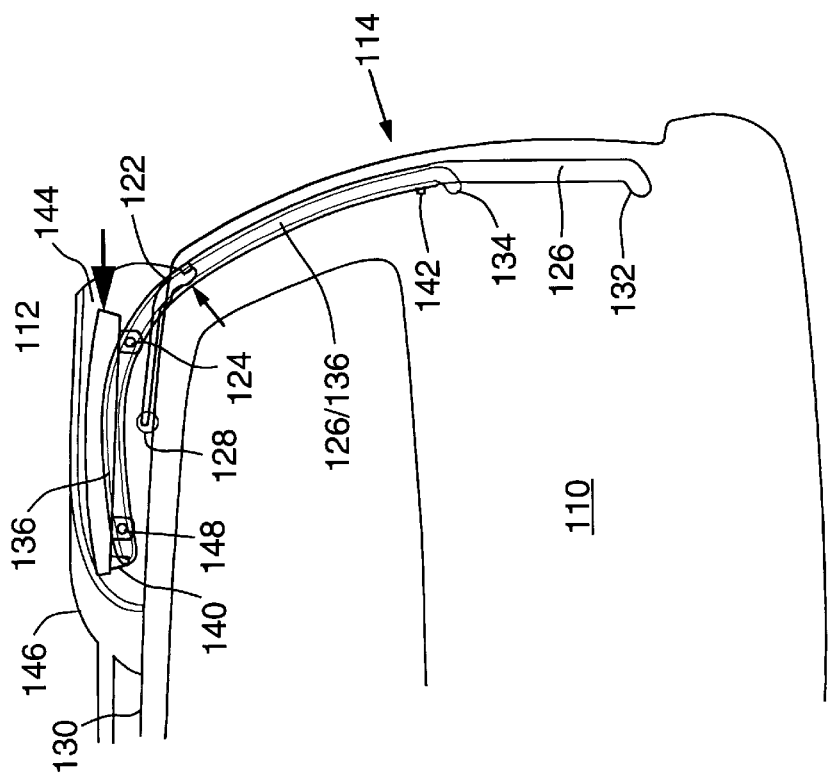

Referring to FIGS. 9A through 9F, the opening sequence of door 112 is shown from the side. FIG. 9A shows door 112 in the fully closed position. As with the first embodiment above, the first step in opening door 112 is lowering secondary door panel 116 slightly to disengage its top edge from top seal 120. Door 112 then moves outward as it is driven along angled channel sections 132 and 134, as shown in FIG. 9B. In this outward position, primary door panel 112 and secondary door panel 116 are separated from their respective weather seals 138 and 118 (shown in FIG. 12), and keys 140 are separated from their respective receptacles 142. As shown in FIG. 9C, roof flap 122 is lowered, primary door panel 112 is raised along channels 126 and 136, and secondary door panel 116 is simultaneously retracted into primary door panel 112. FIG. 9D shows primary door panel 112 nearing the top of door opening 114 with secondary door panel 116 fully retracted within. FIG. 9E shows door 112 rotating up and over roof 130 and into roof pocket 144. Roof pocket 144 is preferably formed as part of a luggage rack 146 on roof 130. However, pocket 144 can be omitted, with door 112 simply retracting above or just below roof 130. FIG. 9F shows the fully open position in which door 112 has reached the end of its travel and is stowed within roof pocket 144 with roof flap 122 raised. As with the first embodiment, the closing of door 112 is accomplished by reversing the above sequence.

Figure 10:
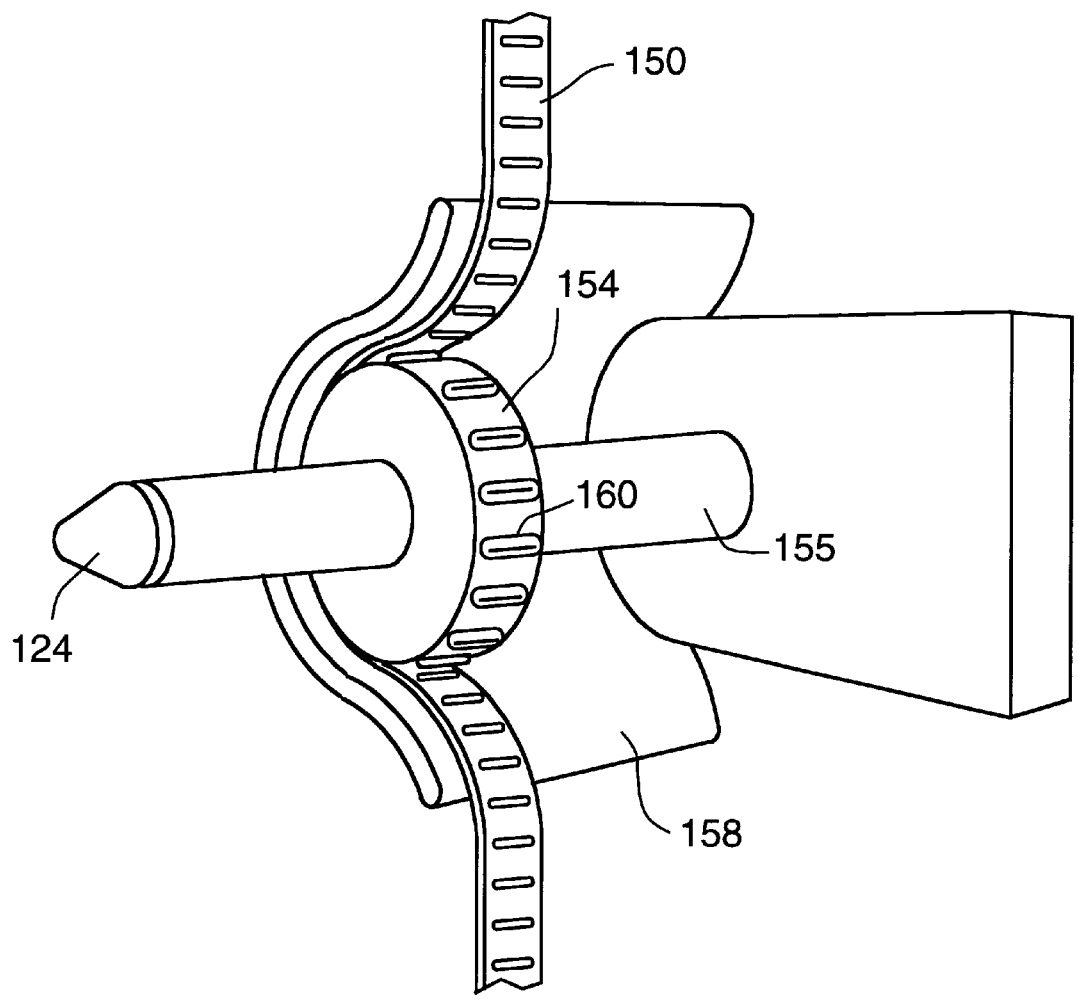
FIG. 10 is an enlarged perspective view of a portion of the tape drive mechanism shown in FIG. 8.

Referring to FIGS. 8 and 10, the drive system for raising and lowering door 112 will be described. A segment of perforated tape 150 is mounted along each side of door opening 114. (For clarity, tape 150 is only shown on the left side of door opening 114 in FIG. 8.) Mounting clamps 152 are used to attach each end of tape segments 150 to body 110. Preferably, a tensioning device is located at one end of each tape segment 150 or on door 112, or at least one mounting clamp 152 is slidably mounted to allow the tension of tape 150 to be adjusted. A sprocket 154 and drive shaft 155 are rotably mounted on each side of door 112. Each sprocket 154 engages one of the perforated tape segments 150. Motor 156 located within door 112 drives sprockets 154 alternately up and down tapes 150 to raise and lower door 112, respectively. A tape retainer 158 is located adjacent to each sprocket 154 to guide tape 150 and to increase the number of sprocket teeth 160 that engage tape 150 at one time. U.S. Pat. No. 5,378,036 which is incorporated herein by reference, more fully describes this tape drive system, and also describes how a single motor and transmission may be utilized to drive both primary door panel 112 and secondary door panel 116. For sample sections, see column 14, lines 1–60 and column 9, line 55 to column 11, line 47 with reference to FIGS. 4–10 and 23A–23F.

Figure 11:
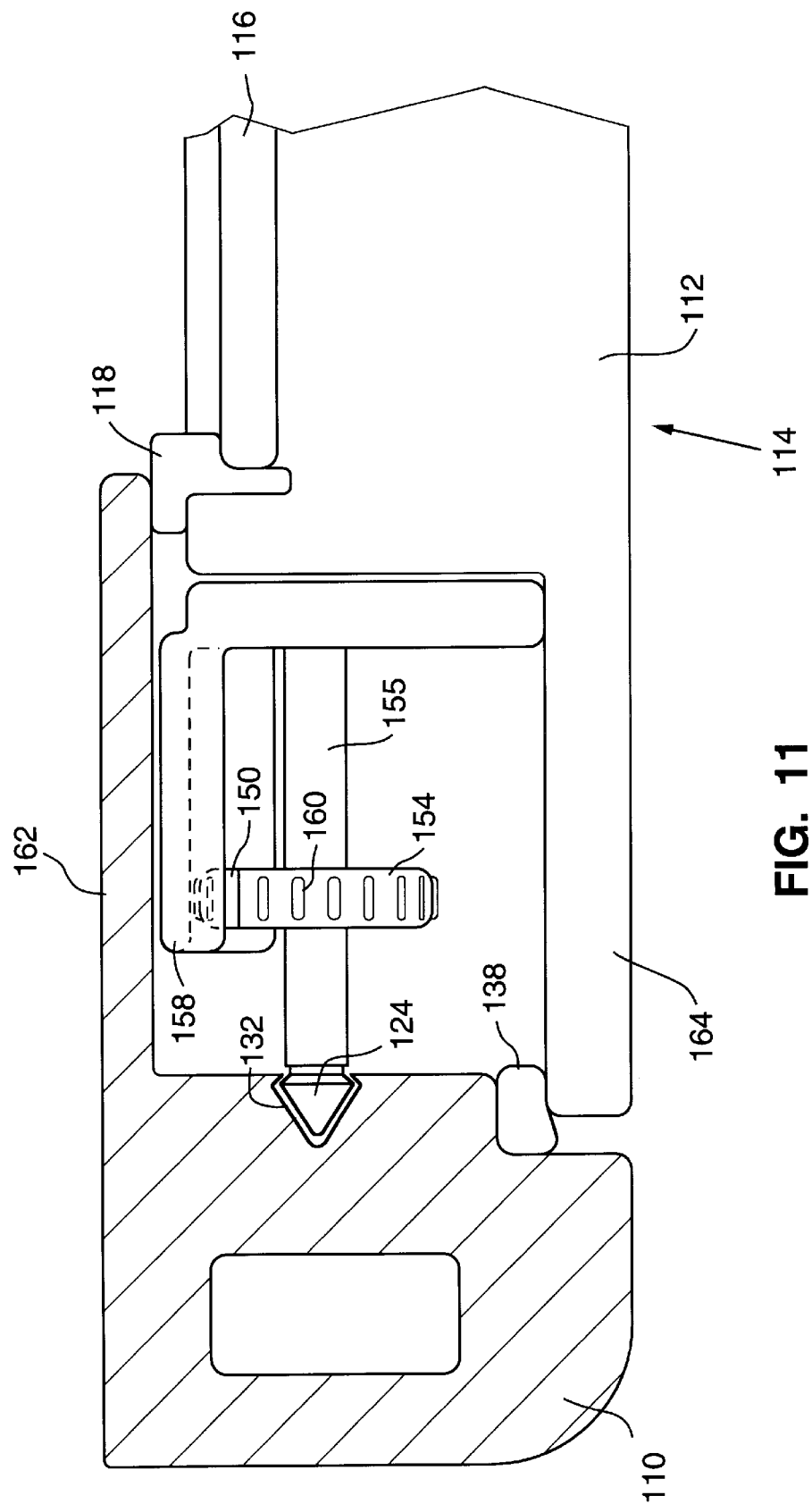
FIG. 11 is an enlarged plan view with parts shown in section showing a lower roller and a portion of the door in FIG. 8 mating with the vehicle body in a fully closed position.

Referring to FIGS. 11 and 12, the configuration of weather seals 118 and 138 is shown. Inner body protrusion 162 serves to support tape 150 and to mount window seal 118. Outer door skin protrusion 164 serves to cover rollers 124 and 148 and sprocket 154. Window seal 118 is mounted on body 110 such that seal 118 contacts secondary door panel 116 when primary door panel 112 is in the fully closed position and secondary door panel 116 is extended from primary door panel 112, as shown in FIG. 11. Similarly, door seal 138 is mounted on body 110 such that seal 138 contacts door skin protrusion 164 when door 112 is lowered into the fully closed position, also shown in FIG. 11. Note that in this position, lower roller 124 is located in angled channel section 132. As door 112 is raised toward the open position, roller 124 travels along angled channel section 132 to vertical channel section 126, as shown in FIG. 12. This moves door panels 112 and 116 outward away from their respective seals 138 and 118. Door panels 112 and 116 can then travel upward, as previously described, without contacting either seal 118 or 138.

Figure 13:
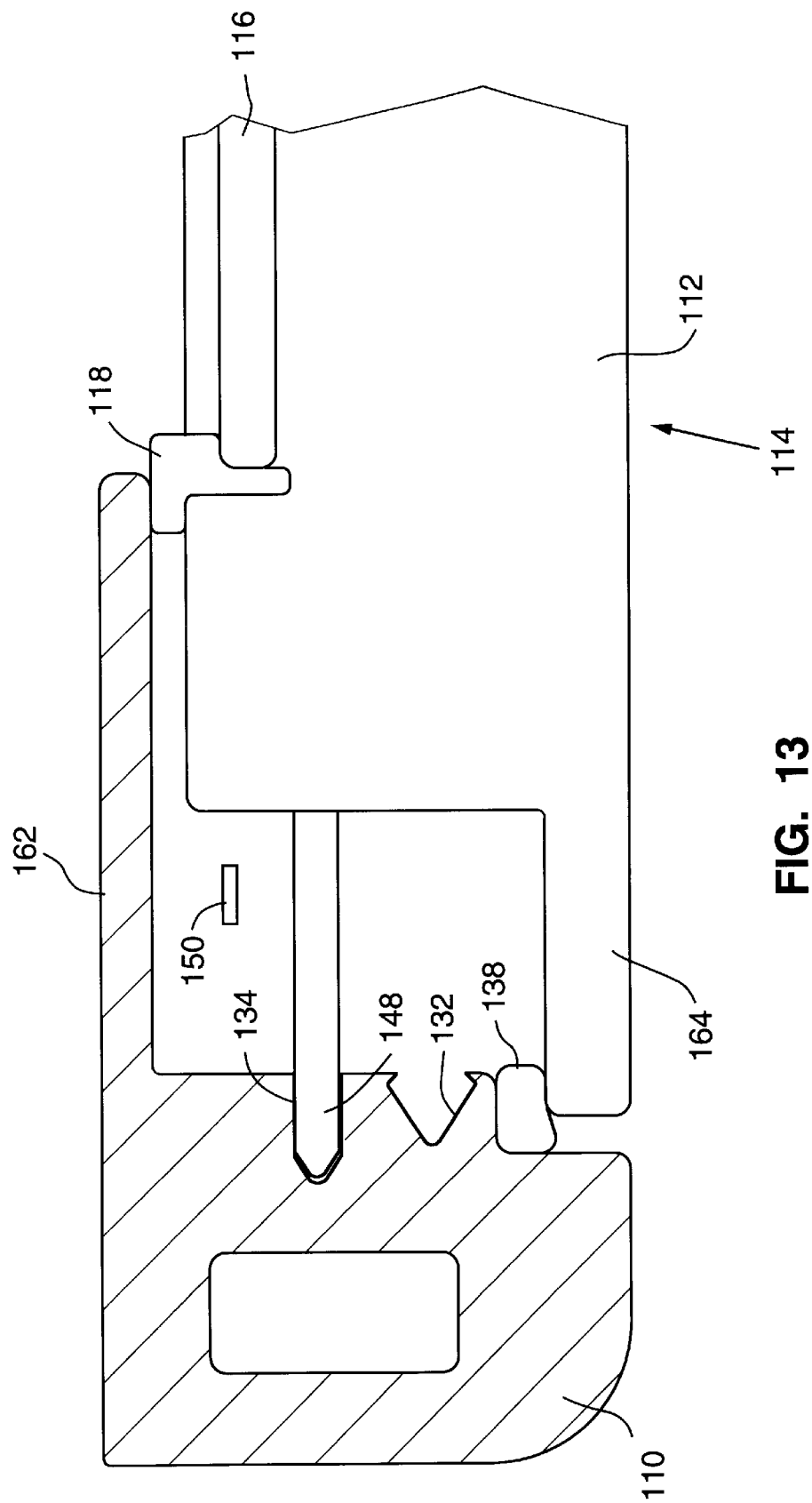
FIG. 13 is an enlarged plan view with parts shown in section showing an upper roller and a portion of the door in FIG. 8 mating with the vehicle body in a fully closed position.

Referring to FIG. 13, primary door 112 is shown in the fully closed position similar to FIG. 11, but showing a higher portion of door 112 and body 110 where upper roller 148 and corresponding angled channel section 134 are located.

Both embodiments described above are directed to rear vehicle doors. The inventive concept can also be applied in substantially the same way to overhead doors located on one or both sides of a vehicle.

The above descriptions and drawings are for illustrative purposes only. It is to be understood that the present invention is not limited to the embodiments described above and illustrated herein, but encompasses any and all variations falling within the scope of the appended claims.

What is claimed as the invention is:

1. In combination with a wheeled vehicle body having a roof and a vertically extensive door opening beneath said roof, said opening including at least one peripheral edge and having upper and lower portions, an improved assembly for closing said opening, said assembly comprising:

a primary door panel received within the door opening, said primary panel being proportioned for closing of the lower portion of the door opening;

means mounting the primary door panel for slidable movement relative to the vehicle body between a lowered position closing the lower portion of the door opening and an elevated stowed position removed from the door opening above the roof; and a secondary door panel received within the primary door panel for movement relative to the primary panel between a retracted position confined at least partially within the primary panel and an extended position closing the upper portion of the door opening when the primary panel is in the lowered position, said secondary door panel being proportioned for substantially closing the upper portion of the door opening to said at least one peripheral edge.

2. In a combination according to claim 1, the improved assembly further comprising a compartment on the roof of the body disposed for receipt of the primary door panel when the panel is in the stowed position.

3. In a combination according to claim 1, the improved assembly further including at least one motor and at least one transmission unit connected to said primary secondary door panels such that the secondary door panel simultaneously retracts into the primary door panel as the primary panel moves to the stowed position.

4. In a combination according to claim 1, the improved assembly further including means for moving the secondary door panel between the retracted and extended positions when the primary door panel is in the lowered position, independent of movement of the primary panel.

5. In a combination according to claim 1, the improved assembly wherein the secondary door panel comprises a glass window.

6. In combination according to claim 1, wherein the mounting means includes rollers rotatably mounted on the primary door panel for engaging channels located in the vehicle body, the rollers and channels cooperating to guide the primary door panel between the lowered and stowed positions, the primary door panel being generally vertical when in the lowered position and generally horizontal when in the stowed position.

7. In a combination according to claim 1, wherein the vehicle has two body side portions on opposite sides of the primary door panel, each body side portion having a single weather seal of generally uniform cross-section for sealing between the body side portion and both the primary door panel and the secondary door panel, the weather seals being in an expanded position where contacting the secondary door panel and in a compressed position where contacting the primary door panel.

8. In combination with a wheeled vehicle body having a roof and a vertically extensive door opening beneath said roof, said opening including at least one peripheral edge and having upper and lower portions, an improved assembly for closing said opening, said assembly comprising:
   a primary door panel received within the door opening, said primary panel being proportioned for closing of the lower portion of the door opening;
   means mounting the primary door panel for slidable movement relative to the vehicle body between a lowered position closing the lower portion of the door opening and an elevated stowed position removed from the door opening over the roof;
   a secondary door panel received within the primary door panel for movement relative to the primary panel between a retracted position confined at least partially within the primary panel and an extended position closing the upper portion of the door opening when the primary panel is in the lowered position, said secondary door panel being proportioned for substantially closing the upper portion of the door opening to said a least one peripheral edge; and,
   interengageable members positioned at predetermined locations on the primary panel and vehicle body to integrate the primary panel into the body when the primary panel is in the lowered position whereby the primary panel becomes an integral structural member of the body when in the lowered position.

9. In a combination according to claim 8, the improved assembly further comprising a compartment on the roof of the body disposed for receipt of the primary door panel when the panel is in the stowed position.

10. In a combination according to claim 8, the improved assembly wherein the interengageable members include first tapered members fixed relative to the body and second tapered members fixed relative to the primary panel, said first and second tapered members being disposed for complementary mating engagement when the primary panel is in the lowered position.

11. In a combination according to claim 8, the improved assembly wherein:
   the door opening and primary door panel have generally vertically disposed edge portions to either side of the primary panel which assume facing relationship when the primary panel is in the lowered position; and,
   the interengageable members comprise laterally spaced apart first tapered members fixed relative to the body at each of the vertically disposed edge portions of the door opening and laterally spaced apart second tapered members fixed relative to the primary panel at each of the vertically disposed edge portions thereof, said first and second tapered members being disposed for complementary mating engagement when the primary panel is in the lowered position.

12. In a combination according to claim 8, the improved assembly further including at least one motor and at least one transmission unit connected to said primary and secondary door panels such that the secondary door panel simultaneously retracts into the primary door panel as the primary panel moves to the stowed position.

13. In a combination according to claim 8, the improved assembly further including means for moving the secondary door panel between the retracted and extended positions when the primary door panel is in the lowered positions independent of movement of the primary panel.

14. In a combination according to claim 8, the improved assembly wherein the secondary door panel comprises a glass window.

15. In a combination according to claim 8, wherein the mounting means includes rollers rotatably mounted on the primary door panel for engaging channels located in the vehicle body, the rollers and channels cooperating to guide the primary door panel between the lowered and stowed positions, the primary door panel being generally vertical when in the lowered position and generally horizontal when in the stowed position.

16. A vertically sliding door closure assembly for a wheeled vehicle having a roof, a generally vertical door aperture beneath a rear edge of the roof and two side body portions located on opposite sides of the vehicle adjacent to the door aperture, the assembly comprising:
   a primary door panel;
   a secondary door panel retractable within the primary door panel;
   a plurality of door rollers rotatably attached to opposite lateral edges of the primary door panel; and
   two channels located on opposite side body portions adjacent to the door aperture and extending over a rear portion of the roof, the channels engaging the door rollers for guiding the primary door panel between a generally vertical closed position over a bottom portion of the door aperture and a generally horizontal open position above the roof and substantially parallel to the roof,
   wherein the secondary door panel is selectively movable between an extended position above the primary door panel covering a upper portion of the door aperture when the primary door panel is in the closed position and a retracted position inside the primary door panel when in the open position, the primary and secondary door panels serving to close the door aperture when in the closed position, the secondary door panel retracting into the primary door panel and the primary door panel moving over the roof when in the open position, and
   wherein the channels have lower ends that are inwardly angled to guide the primary door panel inward as it nears the closed position.

17. The door closure assembly of claim 16, further comprising a generally vertical tape segment located on each of the two side body portions, sprockets located on opposite lateral side edges of the primary door panel, and a motor located within the primary door panel for rotably driving the sprockets, each tape segment having two ends that are both secured to one of the side body portions to extend the tape segment in a generally vertical orientation, the tape segments having a series of apertures therethrough for engaging complementary shaped teeth in the sprockets, the motor acting to alternately drive the sprockets up and down the tape segments to raise and lower the primary door panel.

18. In combination with a wheeled vehicle body having a roof and a vertically extensive door opening beneath said roof, said opening having upper and lower portions, an improved assembly for closing said opening, said assembly comprising:

a first guide member connected to the body and defining overlapping paths;

a primary door panel received within the door opening, said primary panel being proportioned for closing of the lower portion of the door opening;

a second guide member connected to the primary door panel and cooperating with said first guide member for slidably moving the primary door panel relative to the vehicle body between a lowered position closing the lower portion of the door opening and an elevated stowed position removed from the door opening adjacent the roof; and a secondary door panel received within the primary door panel for movement relative to the primary panel between a retracted position confined at least partially within the primary panel and an extended position closing the upper portion of the door opening when the primary panel is in the lowered position, said secondary door panel being proportioned for closing of the upper portion of the door opening.

19. In a combination according to claim 18, the improved assembly further comprising a roof flap pivotally mounted to the body and being selectively movable to a position that is clear of a path of travel of the primary door panel.

20. In a combination according to claim 18, wherein the secondary door panel simultaneously retracts into the primary door panel as the primary panel moves to the stowed position.

21. In a combination according to claim 18, wherein the first guide remember includes guide elements located on opposite sides of the door opening.

22. In combination according to claim 21, wherein the guide elements include spaced apart channels.

23. In combination according to claim 18, wherein the first guide member includes a plurality of channels and the second guide member includes a plurality of rollers slidably received in the channels.

24. In combination according to claim 18, wherein the primary door panel is stowed at one of above, within or below the roof.

* * * * *

UNITED STATES PATENT AND TRADEMARK OFFICE
CERTIFICATE OF CORRECTION

PATENT NO : 5,921,611
DATED : July 13, 1999
INVENTOR(S) : John A. Townsend

It is certified that error appears in the above-identified patent and that said Letters Patent is hereby corrected as shown below:

Col. 10, line 18
 replace "remember"
 with --member--.

Signed and Sealed this

Second Day of May, 2000

Attest:

Q. TODD DICKINSON

*Attesting Officer*          *Director of Patents and Trademarks*